US012752404B2

(12) United States Patent
Wei et al.

(10) Patent No.: US 12,752,404 B2
(45) Date of Patent: Oct. 6, 2026

(54) TORQUE WRENCH

(71) Applicant: STANLEY BLACK & DECKER MEA FZE, Dubai (AE)

(72) Inventors: Kaixuan Wei, Taichung (TW); Shi Hong Liao, Taichung (TW); Yen-ting Wu, Taoyuan (TW)

(73) Assignee: Stanley Black & Decker MEA FZE, Dubai (AE)

( * ) Notice: Subject to any disclaimer, the term of this patent is extended or adjusted under 35 U.S.C. 154(b) by 141 days.

(21) Appl. No.: 17/710,119

(22) Filed: Mar. 31, 2022

(65) Prior Publication Data

US 2022/0324087 A1 Oct. 13, 2022

(30) Foreign Application Priority Data

Mar. 31, 2021 (EP) .................................... 21166468

(51) Int. Cl.
*B25B 23/142* (2006.01)

(52) U.S. Cl.
CPC ................................ *B25B 23/1427* (2013.01)

(58) Field of Classification Search
CPC .............. B25B 23/1427; B25B 23/142; B25B 23/1422; B25B 23/14; B25B 23/141; B25B 23/16
USPC ........................................................... 81/477
See application file for complete search history.

(56) References Cited

U.S. PATENT DOCUMENTS

| | | | | |
|---|---|---|---|---|
| 3,832,916 | A * | 9/1974 | Schoeps | B25B 23/0021 81/464 |
| 4,510,825 | A * | 4/1985 | Neron | B25B 17/00 81/57.29 |
| 5,662,012 | A | 9/1997 | Grabovac | |
| 2002/0040628 | A1 | 4/2002 | Kemp et al. | |
| 2012/0048073 | A1 * | 3/2012 | Wu | B25B 23/1427 81/478 |
| 2014/0338419 | A1 * | 11/2014 | Hsieh | G01L 25/003 81/477 |

FOREIGN PATENT DOCUMENTS

| | | | | |
|---|---|---|---|---|
| EP | 1321240 | A2 * | 6/2003 | B25B 23/1427 |
| WO | 2011005892 | A1 | 1/2011 | |

OTHER PUBLICATIONS

Machine Translation of EP 1321240 A2 (Year: 2002).*
Extended European Search Report, issued in application No. 21166468.5, dated Nov. 11, 2021, 7 pages.

* cited by examiner

*Primary Examiner* — David S Posigian
*Assistant Examiner* — Michael A Gump
(74) *Attorney, Agent, or Firm* — The Webb Law Firm

(57) ABSTRACT

A torque wrench for applying torque to fasteners, said torque wrench comprising a fastener drive structure having a head constructed and arranged to be removably engaged with a fastener and tang structure extending rearwardly from said head.

20 Claims, 10 Drawing Sheets

TORQUE WRENCH

FIELD OF THE INVENTION

The present invention relates to a torque wrench for applying torque to fasteners. More specifically, the present invention relates to a torque wrench having a scale ring capable of providing simultaneous measurement in both metric and imperial units.

BACKGROUND OF THE INVENTION

Torque wrenches are well known in the art. Typically, a torque wrench includes a fastener drive structure having a fastener engaging head, such as a ratchet-type head, and an elongated tang member extending from the head. The fastener drive structure is inserted within a casing structure. The fastener drive structure and the casing structure are pivotally connected by a pivot pin for relative pivotal movement between a normal position and a torque exceeded position. A tang engaging member is biased by a spring into engagement with a rear end portion of the tang member to maintain the fastener drive structure and the casing structure in the normal position during a torque applying operation. An adjuster is provided to adjust the stress in the spring. During the application of torque to the fastener, the spring maintains the fastener drive structure and the casing structure in the normal position until the torsional resistance offered by the fastener reaches a threshold level determined by the spring force. Upon reaching that torsional resistance, the manual force being applied to the casing structure pivots the casing structure relative to the fastener drive structure, thereby causing the casing structure to contact the fastener drive structure to create an audible "click." This "click" indicates to the user that the threshold level of torque has been reached.

One shortcoming of these types of torque wrenches is that after a period of use, they require calibration in order to maintain their accuracy. Calibration is an intricate process that often requires the disassembly of the torque wench, resetting the tension of the spring and then reassembly of the torque wrench. When reassembling the torque wrench certain critical parts, such as the handle insert must be adjusted/aligned while others, such as the adjustment shaft must remain perfectly still in order to maintain the newly reset tension of the spring. This intricate process is often inefficient and time consuming. Thus, there exists a need for a torque wrench comprising elements that simplify the calibration process.

Another shortcoming of torque wrench is that the units of measurement are often difficult to read. Typically torque wrenches have a scale printed on their shaft of the wrench body. This scale is often set into units of 10. Another scale in units of 1 is located around the rim of the adjuster handle. As said handle is rotated about the shaft, the rim translates along the scale. The desired setting is measured at the cross section of the two scales. This complex method of determining the measured torque setting is often difficult to read and can lead to errors. Thus, there exists a need for a torque wrench comprising elements that simplify the method of determining the measured torque setting.

Moreover, when a user needs to toggle between metric and imperial measuring system, traditional torque wrenches may have two scales on the shaft of the wrench body. However, if the metric scale on the wrench body is in units of 10, the imperial scale will not have such regular intervals. This is due to the fact that 1.0 Nm equals 0.73 ft-lb. These the reading of these irregular intervals is exacerbated by the fact that there is only a single scale around the rim of the adjuster. In our example, this scale is in the metric units of Nm. Therefore, in order to accurately determine the torque wrench setting in imperial units, a second conversion of the one's units must also take place. This complex method of determining the torque setting in an alternate measuring system often leads to errors. Thus, there exists a need for a torque wrench comprising elements that simplify the method of determining the measured torque setting and can accurately toggle between metric and imperial units.

SUMMARY OF THE INVENTION

In a first aspect, the present invention discloses a torque wrench for applying torque to fasteners, said torque wrench comprising a fastener drive structure having a head constructed and arranged to be removably engaged with a fastener and tang structure extending rearwardly from said head. The torque wrench further includes a wrench body including a casing structure, said fastener drive structure and said casing structure being pivotally connected for pivotal movement relative to one another about a pivot axis (A) from a normal position to a torque exceeded position to generate a torque exceeded signal. The torque wrench also includes a tang engaging and stabilizing structure having a tilt block and a pusher, and wherein said tilt block includes a forward end and a rearward end, and wherein when said casing structure is in its normal position, the tang engaging surface flushly engages a rear end portion of the tang, and the pusher engaging surface flushly engages the pusher, and wherein when said casing structure is in its torque exceeded position, an edge of the tilt block that is adjacent the tang engaging surface engages the rear end portion of the tang, and another edge of the tilt block adjacent the pusher engaging surface engages the pusher. The torque wrench also includes a stressed biasing element applying a biasing force to said tang engaging and stabilizing structure such that, during a torque applying operation wherein a force applied to said wrench body (a) is transmitted as torque to a fastener removably engaged with said head and (b) tends to pivot said casing structure relative so said fastener drive structure about said pivot axis, the biasing force applied by said biasing element maintains the tang engaging and stabilizing structure in engagement with said tang structure rear end portion so as to maintain said casing structure and said fastener drive structure in said normal position thereof until a torsional resistance offered by the fastener reaches a threshold level determined by the biasing force of said biasing element whereat the force being applied to said wrench body pivots said casing structure relative to said fastener drive structure to said torque exceeded position to generate the torque exceeded signal, thus indicating that the torsional resistance being offered by the fastener has reached the threshold level. The torque wrench further includes an adjuster constructed and arranged such that rotational movement thereof adjusts the stress in said biasing element and hence the biasing force applied to said tang engaging and stabilizing structure by said biasing element so as to set the aforesaid threshold level of torsional resistance at which the force being applied to said wrench body pivots said casing structure relative to said fastener drive structure as aforesaid. The torque wrench is characterized in that the adjuster comprises an adjustment shaft having a threaded portion, a splined portion, and a pin retaining portion. The adjuster also includes a handle insert having an outer surface shaped to define one or more gears, and an inner opening that is shaped to receive the splined portion of the adjustment shaft, and wherein the surface of said inner opening includes one or more splines configured to mate with the splines the adjustment shaft such that rotation of the handle insert will impart rotation to the adjustment shaft. The adjuster further includes a handle having an interior recess configured to receive the handle insert, and wherein said recess is positioned within the handle such that at least one gear of the outer surface of the handle insert is in a 12 o'clock orientation within the handle and wherein when said handle insert is disposed in the recess, rotational movement of handle will impart rotational force to the handle insert and subsequently to the adjustment shaft. The adjuster further includes an adjusting nut defining an opening having a threaded surface that is configured to mate with the threaded portion of the adjustment shaft, and wherein when rotational force is applied to the adjustment shaft, the mating threaded portions impart translational movement to the adjusting nut, which adjusts a thrust bearing and apply biasing force of the biasing element.

The present invention discloses a torque wrench for applying torque to fasteners and including a fastener drive structure having a head constructed and arranged to be removably engaged with a fastener and tang structure extending rearwardly from said head. The torque wrench further includes a wrench body having a casing structure, and wherein said fastener drive structure and said casing structure are pivotally connected for pivotal movement relative to one another about a pivot axis (A) from a normal position to a torque exceeded position to generate a torque exceeded signal. The torque wrench also includes a tang engaging and stabilizing structure having a rocker and a pusher. The rocker includes a tang engaging surface and a pusher engaging surface. When said casing structure is in its normal position, the tang engaging surface flushly engages a rear end portion of the tang, and the pusher engaging surface flushly engages the pusher. When said casing structure is in its torque exceeded position, an edge of the rocker that is adjacent the tang engaging surface engages the rear end portion of the tang, and another edge of the rocker adjacent the pusher engaging surface engages the pusher. The torque wrench further includes a stressed biasing element that applies a biasing force to said tang engaging and stabilizing structure such that, during a torque applying operation wherein a force applied to said wrench body (a) is transmitted as torque to a fastener removably engaged with said head and (b) tends to pivot said casing structure relative so said fastener drive structure about said pivot axis. The biasing force applied by said biasing element maintains the tang engaging portion in engagement with said tang structure rear end portion so as to maintain said casing structure and said fastener drive structure in said normal position thereof until a torsional resistance offered by the fastener reaches a threshold level determined by the biasing force of said biasing element whereat the force being applied to said wrench body pivots said casing structure relative to said fastener drive structure to said torque exceeded position to generate the torque exceeded signal, thus indicating that the torsional resistance being offered by the fastener has reached the threshold level. The torque wrench further includes an adjuster constructed and arranged such that rotational movement thereof adjusts the stress in said biasing element and hence the biasing force applied to said tang engaging and stabilizing structure by said biasing element so as to set the aforesaid threshold level of torsional resistance at which the force being applied to said wrench body pivots said casing structure relative to said fastener drive structure as aforesaid.

The torque wrench is characterized in that the adjuster comprises an adjustment shaft having a threaded portion, a splined portion, and a pin retaining portion. The adjuster also includes a handle insert having an outer surface shaped to define one or more gears, and an inner opening that is shaped to receive the splined portion of the adjustment shaft, and wherein the surface of said inner opening includes one or more splines configured to mate with the splines of the adjustment shaft such that rotation of the handle insert will impart rotation to the adjustment shaft. The adjuster further includes a handle having an interior recess configured to receive the handle insert, and wherein said recess is positioned within the handle such that at least one gear of the outer surface of the handle insert is in a 12 o'clock orientation within the handle and wherein when said handle insert is disposed in the recess, rotational movement of handle will impart rotational force to the handle insert and subsequently to the adjustment shaft. The adjuster further includes an adjusting nut defining an opening having a threaded surface that is configured to mate with the threaded portion of the adjustment shaft, and wherein when rotational force is applied to the adjustment shaft, the mating threaded portions impart translational movement to the adjusting nut, which adjusts the biasing force of the biasing element.

In another aspect, the present invention discloses a method of calibrating the preload of a biasing element of a torque wrench comprising the steps of providing a torque wrench according to claim 1, and wherein said biasing element has useful preload range from a first value to a second value. The next step is to place the torque wrench on a calibration bench in a levelled position. A torque is then applied to the torque wrench until it reaches its torque exceeded position. A measurement of an initial torque value at this torque exceeded position. This initial torque value is then compared to the first value. A determination of whether the initial torque value is within an acceptable tolerance range is made. If the initial torque value is within the acceptable tolerance range, proceed to the next step. If, on the other hand, the initial torque value is not within the acceptable tolerance, the tension setting of the biasing element is adjusted with the adjuster, and the steps of applying/measuring initial torque value and comparing the initial torque value to the first value until the initial torque value is within the acceptable tolerance are repeated. The next step is to partially disassemble the adjuster by removing the handle and disengaging the handle insert from the adjustment shaft, and rotating the handle insert such that one of the gears is in the 12 o'clock position. The adjuster is then reassembled by reengaging the handle insert to the adjustment shaft in its new 12 o'clock orientation and the handle is reinstalled.

In yet another aspect, the present invention discloses a scale ring for use with a torque wrench and comprising a measurement surface visible from outside of the torque wrench. Said measurement surface includes a spiraling scale to provide a reading of the selected threshold level of torsional resistance at which the force being applied to said wrench body pivots said casing structure relative to said fastener drive structure. The scale ring further comprises a connecting portion that is connected to an adjusting nut such that translational movement of the adjusting nut also translates the scale ring.

BRIEF DESCRIPTION OF THE DRAWINGS

The accompanying drawings facilitate an understanding of the various embodiments of this invention. In such drawings.

DETAILED DESCRIPTION OF THE INVENTION

Figure 1B:
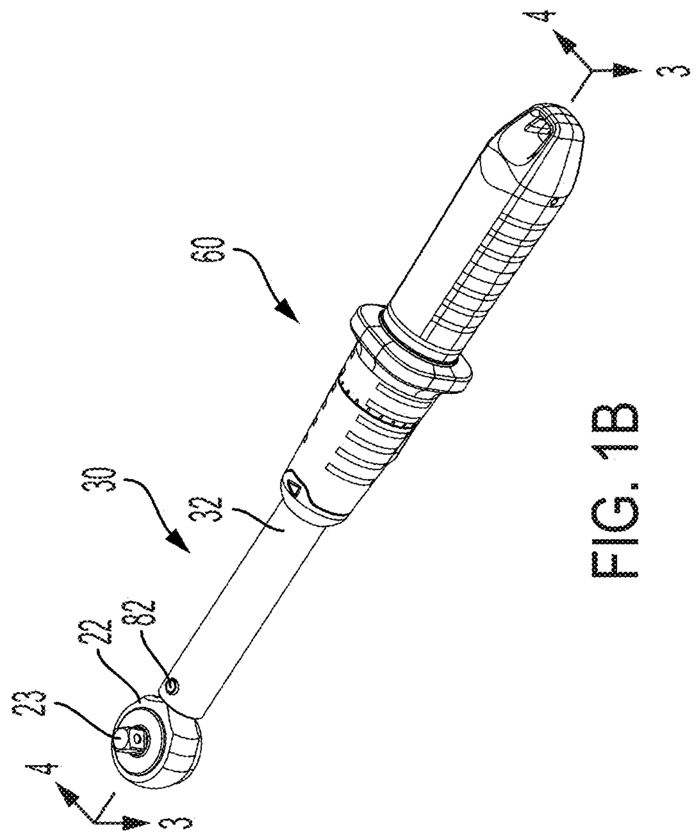
FIGS. 1*a* and 1*b* are is alternate perspective views of a torque wrench constructed in accordance with the principles of the present invention.

FIG. 1 shows a torque wrench, generally shown at 10, for selectively applying torque to fasteners, which wrench 10 embodies the principles of the present invention. FIGS. 2-8 show the main components of the wrench, which include a fastener drive structure, generally shown at 20, a wrench body, generally shown at 30, a tang engaging and stabilizing structure, generally shown at 40, a stressed biasing element, generally shown at 50, and an adjuster, generally shown at 60.

Figure 1A:
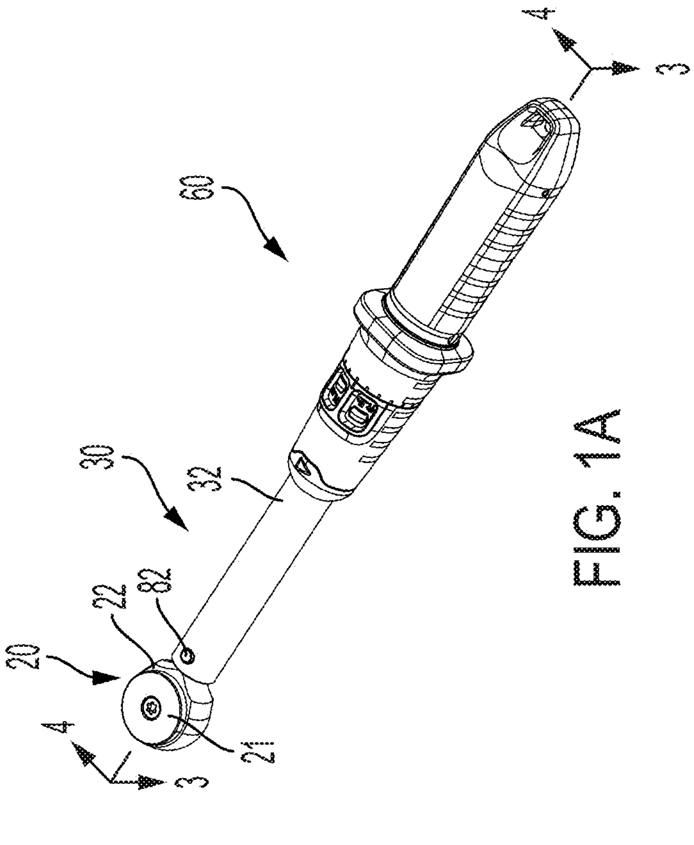
Figure 2:
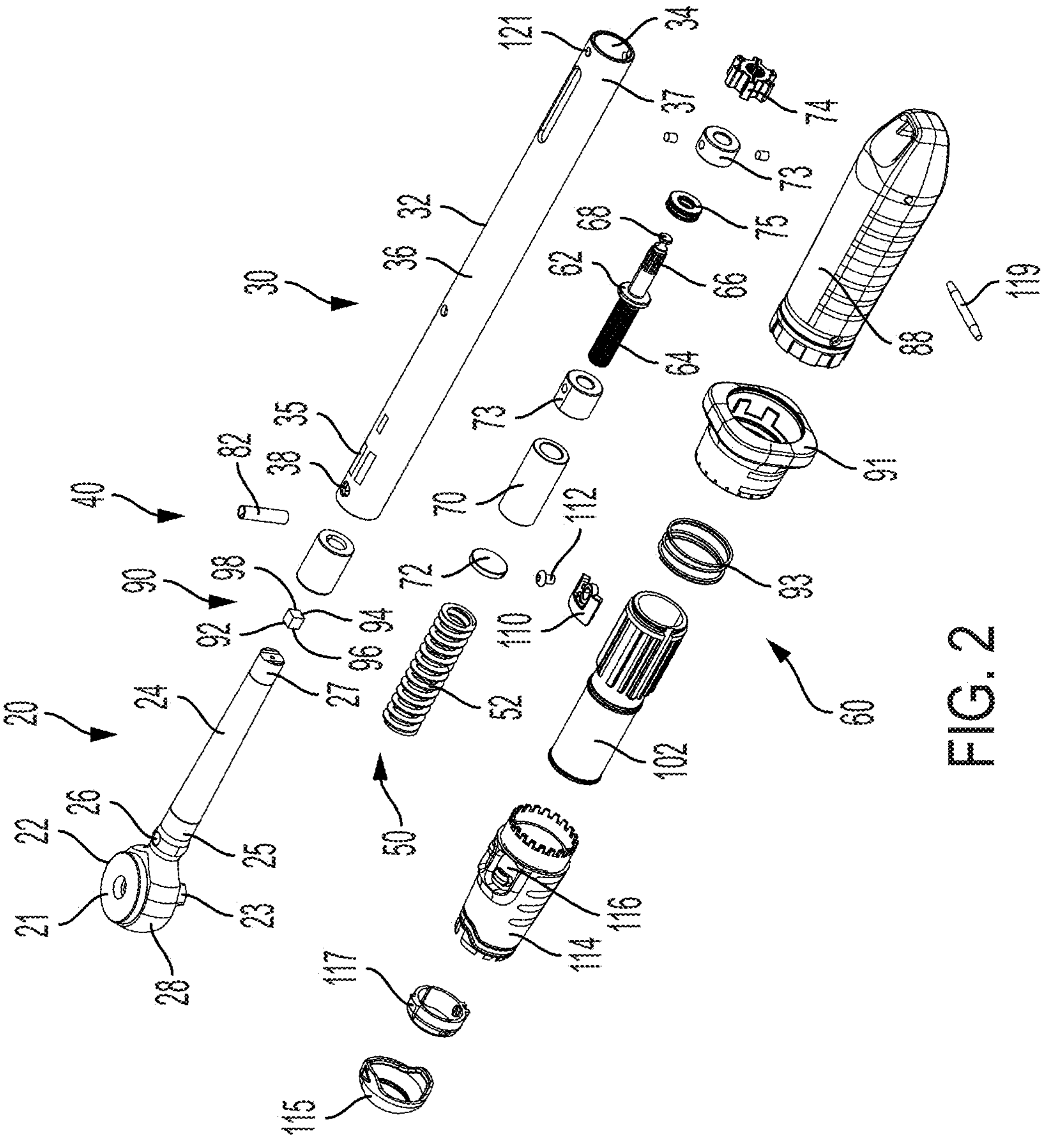
FIG. 2 is an exploded view of the torque wrench of FIG. 1.
Figure 3:
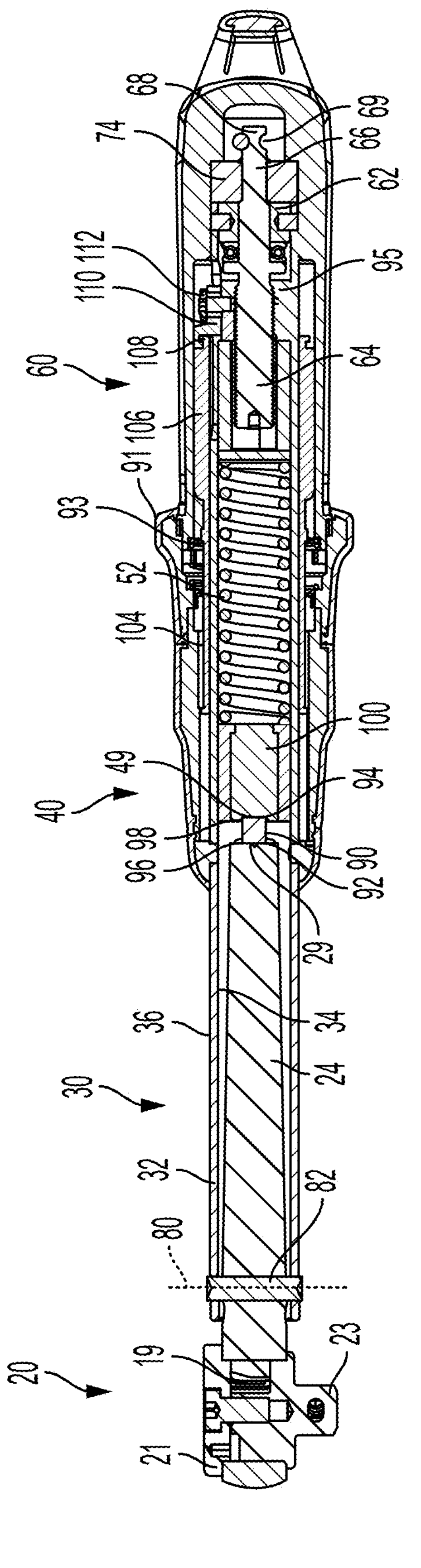
FIG. 3 is a cross-sectional view taken along line 3-3 of FIG. 1 showing the components of the torque wrench in a normal position.

The fastener drive structure 20 has a head 22 constructed and arranged to be removably engaged with a fastener and a tang structure 24 extending rearwardly from the head 22. The tang structure 24 has a hole 26 extending through a front portion 25 thereof. In the embodiment shown, the head 22 is a conventional socket-type ratchet head. The head 22 comprises a mounting portion 28 integrally formed with the tang structure 24 and a conventional ratchet drive assembly 13, which is received within the mounting portion 28. The main components of a conventional ratchet drive assembly are a ratchet gear 15, a pawl 17, and a pawl biasing element 19. The gear is rotatably mounted within the mounting portion such that the gear and the mounting portion are rotatable relative to one another about a gear axis. The gear has a plurality of gear teeth on its outer periphery and a square socket mounting portion, indicated at 23 in FIGS. 1*b*, 2, and 3, for removably mounting a conventional socket to enable removable coupling with a fastener. The pawl is mounted within the mounting portion 28 and is biased into engagement with the gear teeth such that the pawl is in driving engagement with the gear teeth in one direction and ratchets over the gear teeth in an opposite direction. A cover plate, indicated at 21 in FIGS. 1*a*, 2 and 3, is mounted in covering relation over the mounting portion 28 to enclose the gear, the pawl, and the biasing element. The ratchet drive assembly is well known in the art and need not be detailed herein.

The ratchet gear may alternatively be ring-shaped with a fastener receiving opening defined by a plurality of fastener engaging surfaces that are engageable with flat driven surfaces on the head of a fastener received therein. Additionally, although the head 22 is preferably the ratcheting-type, the present invention may be practiced with a non-ratcheting head, such as an open-ended wrench head.

The wrench body 30 includes a generally cylindrical casing structure 32 with generally cylindrical interior and exterior surfaces 34, 36. One end portion 35 of the casing structure 32 has a hole 38 therethrough. The opposite end portion 37 is constructed to mount the adjuster 60, described in greater detail below. Although the principles of the invention are preferred for application to a wrench with a cylindrical casing structure (i.e., a round case wrench), they may be practiced in a wrench with a casing structure of rectangular cross-section (i.e., a flat case wrench).

Figure 4:
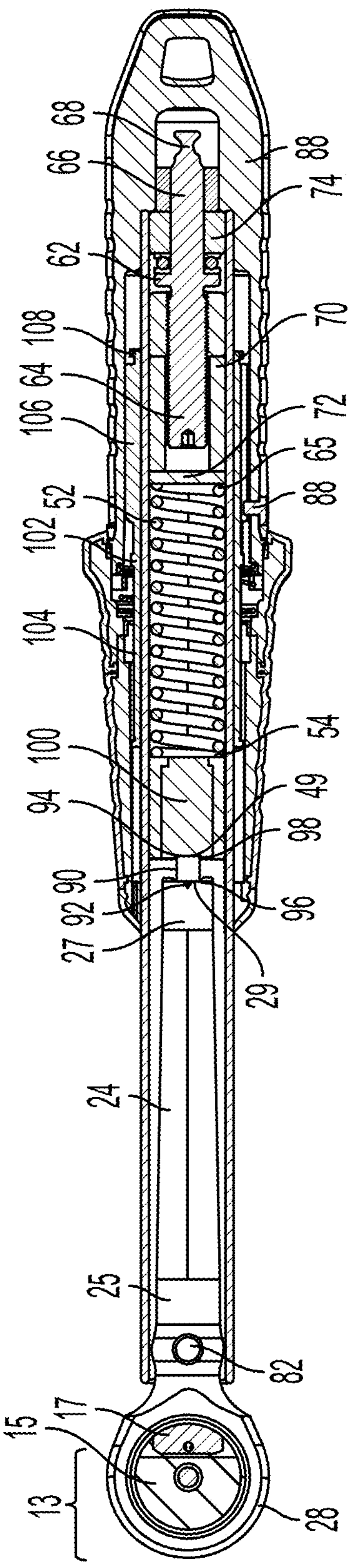
FIG. 4 is a cross-sectional view taken along line 4-4 of FIG. 1 showing the components of the torque wrench in a normal position.

The fastener drive structure 20 and the casing structure 32 are pivotally connected for pivotal movement relative to one another about a pivot axis 80 between a normal position, as shown in FIGS. 3-4, and a torque exceeded position, wherein a torque exceeded signal is generated, as will be further discussed below. Specifically, the tang structure 24 of the fastener drive structure 20 is inserted within the casing structure 32 and the holes 26, 38 are aligned. Then, a pivot pin 82 is inserted through the holes 26, 38. As a result, the fastener drive structure 20 and the casing structure 32 pivot about the pivot pin 82, which defines the pivot axis 80.

The tang engaging and stabilizing structure 40, includes a tilt block 90 and a pusher 100. The tilt block 90 includes a forward end 92 and a rearward end 94. As will be discussed below, when the casing structure is in its normal position the forward end flushly engages a rear end portion 27 of the tang, and the rearward end, flushly engages the pusher. The term "flushly" simply means that a substantial portion of said end surface is in direct contact with its respective counterpart surface. Conversely, when the casing structure is in its torque exceeded position, an edge 96 of the tilt block that is adjacent the forward end engages the rear end portion of the tang, and another edge 98 that is adjacent the rearward end engages the pusher.

The rear end portion 27 of the tang structure 24 and the pusher 100 each have a recess 29, 49 formed therein. Tilt block 90, is received in the recesses 29, 49 and is movable between the recesses 29, 49 to accommodate pivotal movement of the casing structure 32 and the tang engaging and stabilizing structure 40 relative to the fastener drive structure 20.

Those skilled in the art will recognize that the tilt block 90 may be a cube. Thus, forward and rearward ends 92, 94 of the tilt block 90 each have a pair of generally parallel edges 96, 98. The tilt block 90 and the recesses 29, 49 are oriented such that the pairs of generally parallel edges 96, 98 are arranged generally parallel to one another. Further, the tilt block 90 is configured such that a distance between opposite edges of the forward and rearward ends 92, 94 thereof is greater than a distance between adjacent edges of the forward and rearward ends 92, 94 thereof.

The stressed biasing element 50, in the form of a coil spring 52, applies a biasing force to the tang engaging and stabilizing member 40 to maintain the recess 49 of the pusher 100 in engagement with the tilt block 90 so as to maintain the casing structure 32 and the fastener drive structure 20 in the normal position thereof, as shown in FIGS. 3-4. One end 54 of the biasing element 50 engages against the pusher 100 and an opposite end 65 engages against a washer 72 that sits atop a spacer 70.

Movement of the spacer 70 and washer 72 are controlled by the adjuster 60 and may be considered to be a part of the same. Axial movement of the spacer 70 and washer 72 adjusts the stress in the biasing element 50 and hence the biasing force applied to the pusher 100 by the biasing element 50. Those skilled in the art will recognize that additional spacers 73 and bearings 75 may also be used in within the adjuster 60. These additional spacers and bearings are not required as their geometries could be built into other parts. Instead, they are present to achieve efficiencies in manufacture.

The adjuster 60 is constructed and arranged such that the rotational movement thereof adjusts the stress in the biasing element and hence the biasing force applied to said tang engaging and stabilizing structure by said biasing element so as to set the threshold level of torsional resistance at which the force being applied to said wrench body pivots said casing structure relative to said fastener drive structure from the normal position to the torque exceeded position. The adjuster 60 includes an adjustment shaft 62 having a threaded portion 64, a splined portion 66, and a pin retaining portion 68. The threaded portion 64 may include a standard screw threading such as 2N-LH-M10×1.0-6g, where N is the number of thread starts. In this instance, the thread is a double start. LH refers to a left-hand thread. M10 is the outer diameter of the thread in millimetres. In this instance, there the outer diameter is 10 mm. The figure 1.0-6g refers to a 1.0 mm pitch and it's the tolerance of precision. Thus, for every full rotation of the adjustment shaft, the thread travels 1.0 mm. However, because there are two thread starts, for every full turn, the thread travels 2.0 mm. Those skilled in the art will recognize that the threaded portion 64 may include other standard screw threading without departing from the scope of the invention. The splined portion 66 may include a plurality of grooves 67 that function as splines. In a preferable embodiment, the splined portion 66 includes 10 splines. The primary function of the splines is to be engaged by an external object and impart the rotational motion of the external object to the adjustment shaft 62. Finally, the pin engaging portion 68 of the adjustment shaft is chamfered groove 69. Preferably, the chamfered groove goes around the circumference of the adjustment shaft 62. Having a chamfered groove that encompasses the adjustment shaft permits a pin to engage the adjustment shaft in any rotational position. As will be discussed below, this is advantageous when reassembling the adjuster as a part of the calibration process.

Figure 7B:
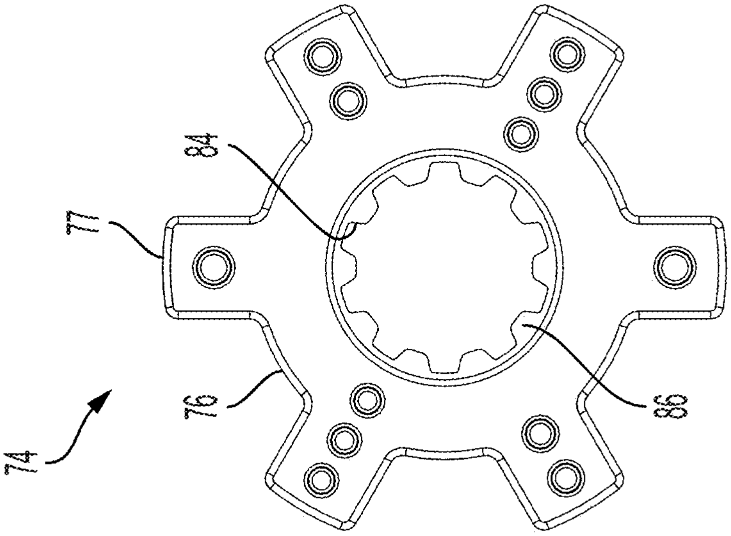
FIGS. 7*a* and 7*b* are respectively a perspective and plan view of a holder insert of an adjuster of the torque wrench.
Figure 7A:
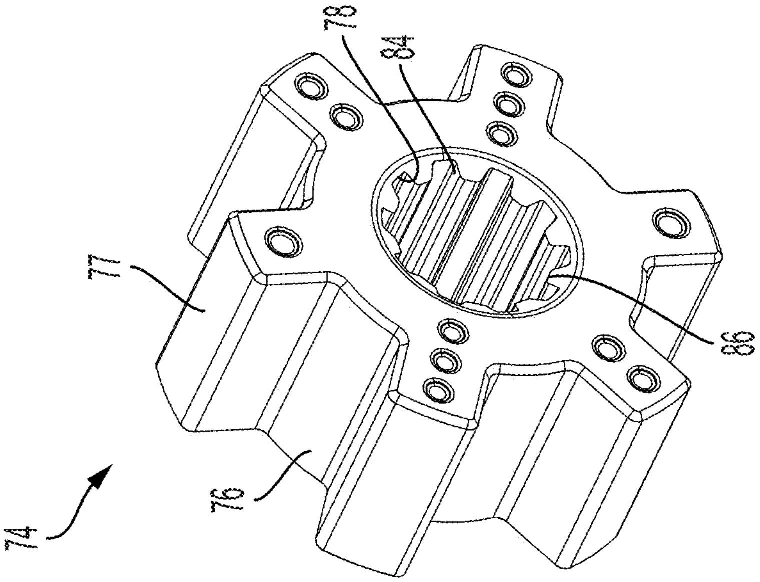

The adjuster 60 also includes a handle insert 74 having an outer surface 76 shaped to define one or more gears 77, and an inner opening 78 that is shaped to receive the splined portion 66 of the adjustment shaft 62, and wherein the surface 84 of said inner opening includes one or more splines 86 configured to mate with the splines 67 of the adjustment shaft such that rotation of the handle insert 74 will impart rotation to the adjustment shaft 62. In a preferable embodiment, the handle insert 74 will include three mirrored image gears 77 as shown in FIGS. 7*a* and 7*b*. Preferably, the handle insert 74 also includes ten interior splines 86 to match the preferred number of splines on splined portion of the adjustment shaft.

The adjuster 60 also includes a handle 88 having an interior recess 92 configured to receive the handle insert 74, and wherein said recess is positioned within the handle such that at least one gear 77 of the outer surface of the handle insert is in a 12 o'clock orientation within the handle 88 and wherein when said handle insert is disposed in the recess, rotational movement of handle will impart rotational force to the handle insert 74 and subsequently to the adjustment shaft 62.

The handle 88 may further include a locking ring 91 that is biased by a spring 93. The locking ring is configured to prevent unwanted rotational movement in the handle. Thus, the locking ring prevents the handle from rotating until said rotational movement is desired. In operation, a user may pull the locking ring 91 down against the bias of the spring 93. This unlocks the handle and permits rotational movement of the handle. When the user releases the locking ring, the spring biases the locking ring back into its locking position where rotational movement of the handle is limited.

The adjuster 60 further includes an adjusting nut 95. The adjusting nut defines an opening 96 having a threaded surface 98 that is configured to mate with the threaded portion 64 of the adjustment shaft 62, and wherein when rotational force is applied to the adjustment shaft, the mating threaded portions impart translational movement to the adjusting nut, which adjusts a spacer 70 and apply biasing force of the biasing element (50).

Figure 8B:
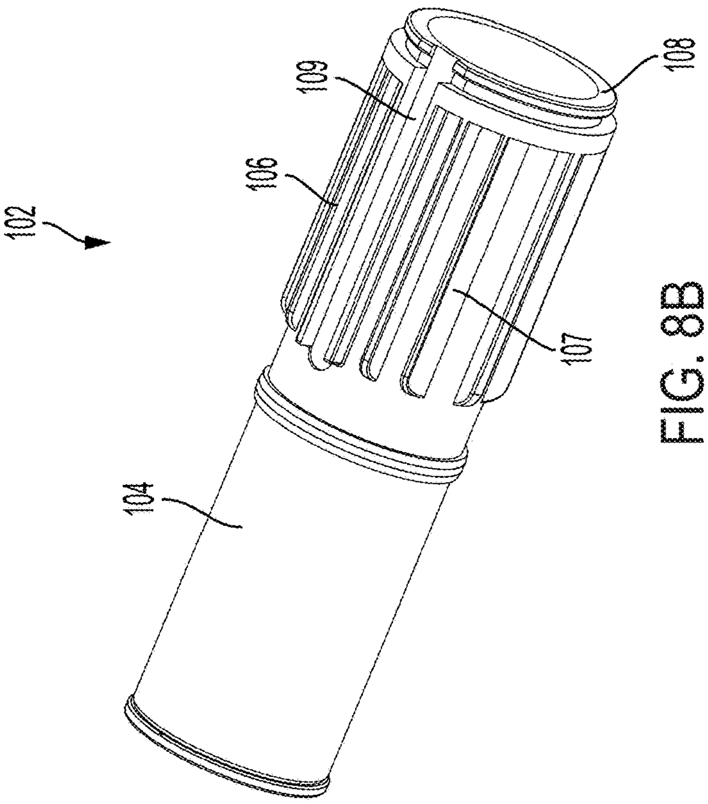
FIGS. 8*a* and 8*b* are alternate perspective views of a scale ring of the torque wrench.
Figure 8A:
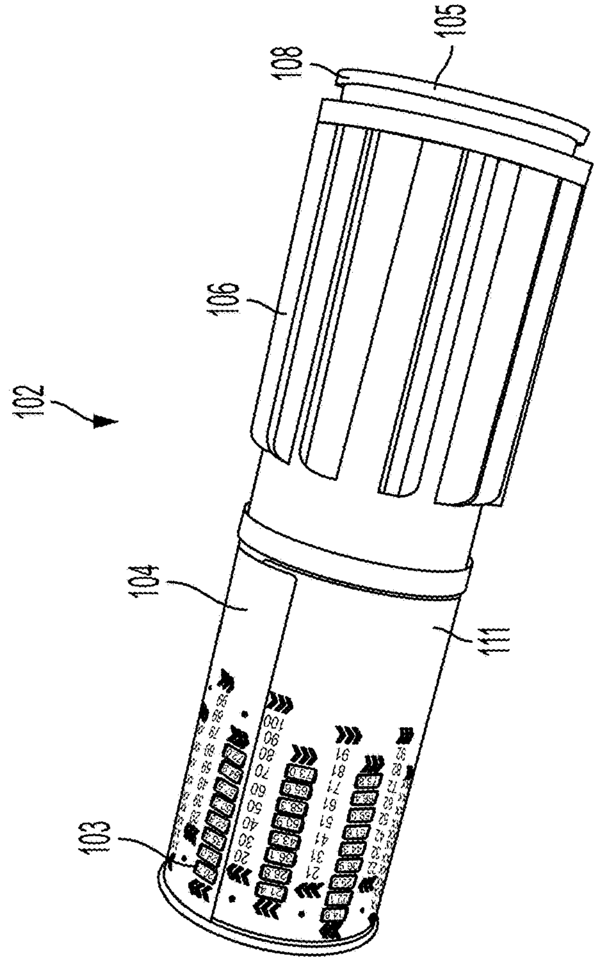
Figure 9:
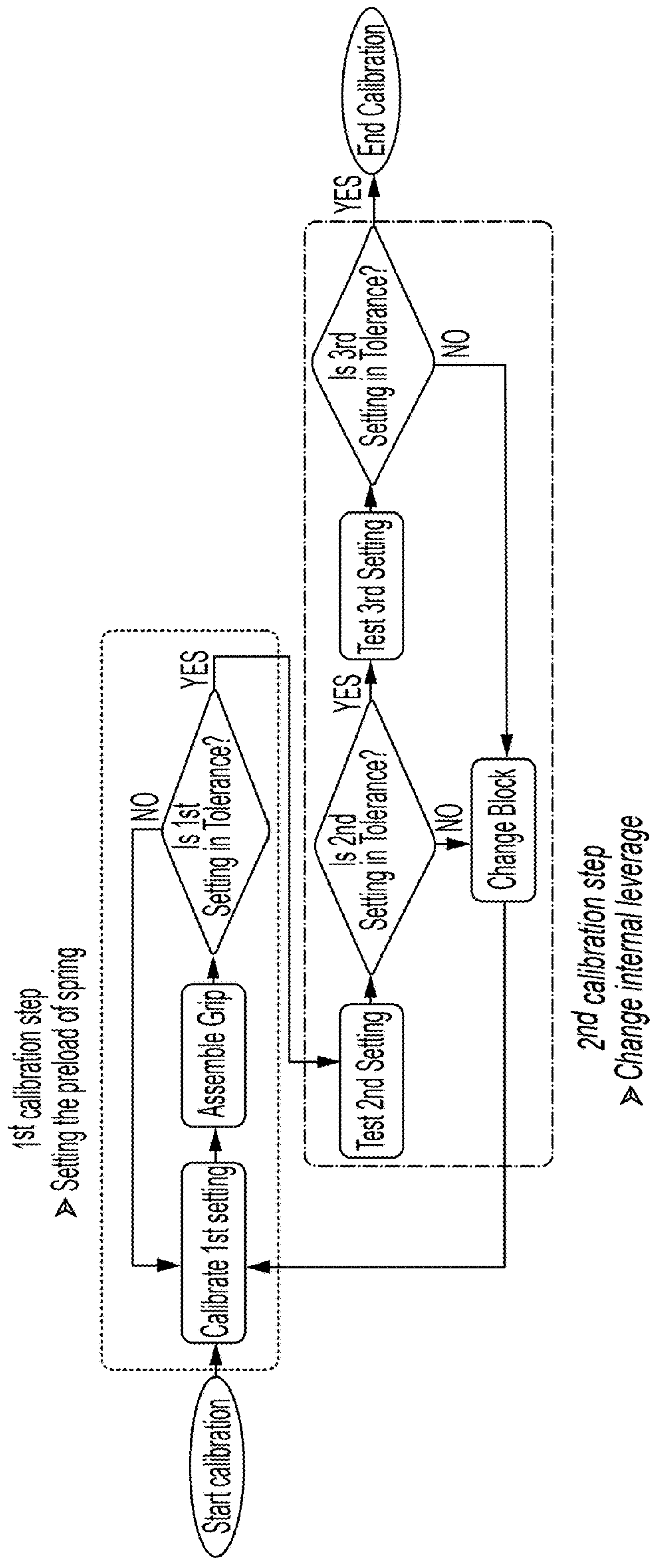
FIG. 9 is a flow chart outlining the steps of a method for calibrating a torque wrench.

In one preferable embodiment, the adjuster 60 further includes a scale ring 102. As shown in FIGS. 8*a* and 8*b*, the scale ring is substantially cylindrical in shape and includes a measurement surface 104 that is visible from the outside of the torque wrench 10. The measurement surface includes a spiraling scale 103 to provide a reading of the selected threshold level of torsional resistance at which the force being applied to said wrench body pivots said casing structure relative to said fastener drive structure. In a preferable embodiment, the measurement surface includes a scale for torque measurements in both metric units (Nm) and imperial units (ft-lb).

Figure 10:
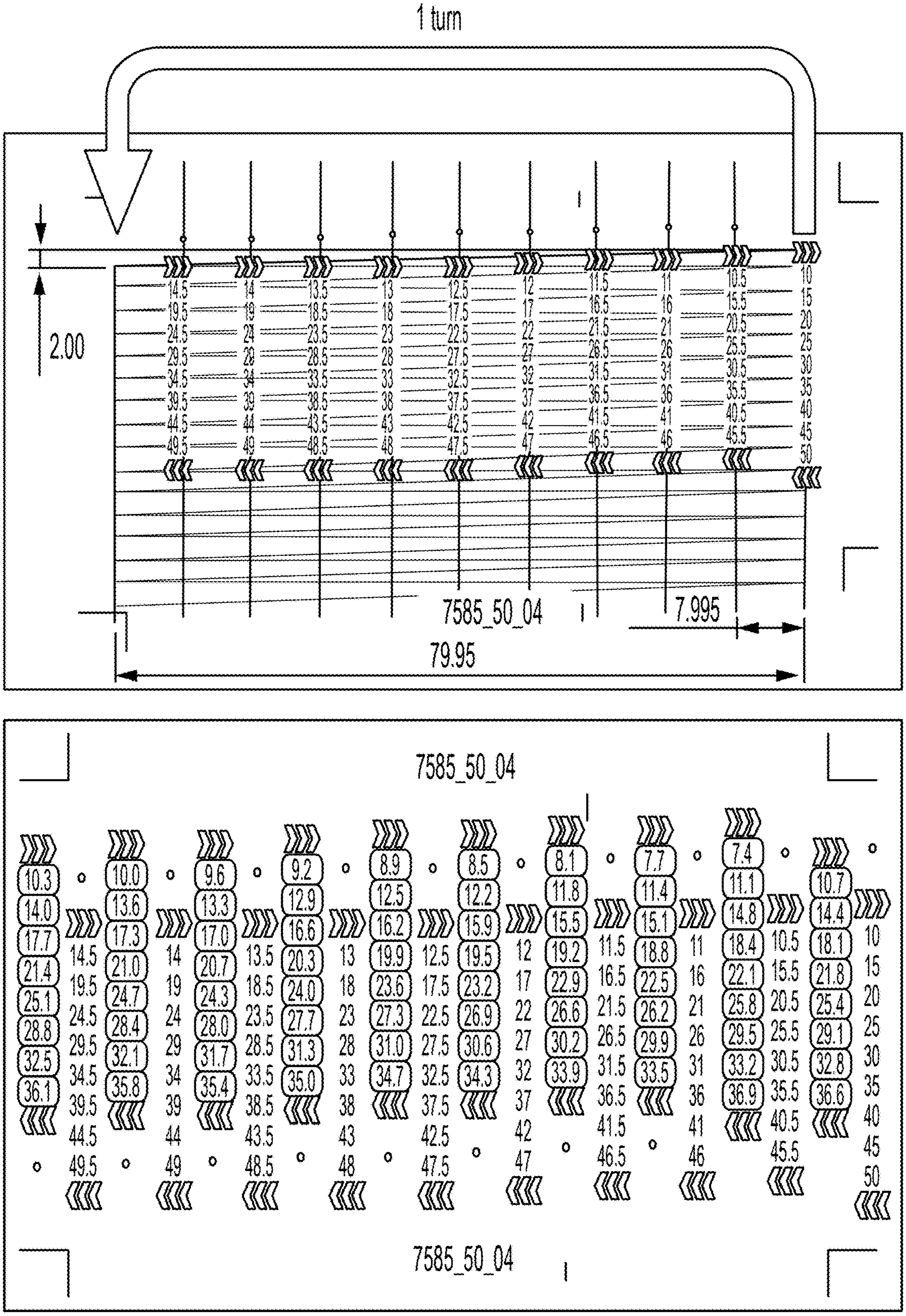
FIG. 10 is a pictorial representation of a scale in accordance with an embodiment of the application

In one preferred embodiment, the spiraling scale 103 is printed on a label 111 that is affixed to the measurement surface 1. Determination and positioning of the specific location of the values of spiraling scale 103 is achieved via a method that relies on both the features of threaded portion of the adjustment shaft and the geometry of the measurement surface. The first step is to determine the length of the label 111. This is achieved by using the circumference of measurement surface, which is equal to the diameter×pi. For precision, two times the thickness of the label may be added in order to obtain the exact required length of the label. This length is then divided into equal indexes to permit readings along the rotation of a full turn of the measurement surface. In a preferable embodiment, the length of the label is divided into 10 equal indexes. Following determination of the label length and index sizes, a determination of the pitch of the spiral must be made. In other words, how far will the scale ring translate after each full rotation. This pitch is controlled by the features of the threaded portion 64 of the adjustment screw 62. As discussed above, the threaded portion may use a standard screw threading such as 2N-LH-M10×1.0-6g. In this threading, the figure 1.0-6g refers to a 1.0 mm pitch and its the tolerance of precision. Thus, for every full rotation of the adjustment shaft, the thread travels 1.0 mm. However, because there are 2 N thread starts, for every full turn, the thread travels 2.0 mm. For the purposes of creating our spiral scale 103, moving from right to left, for each of our 10 equal indexes, the next figure must be 0.2 mm lower than the figure to its immediate right. Thus, when a complete rotation is achieved, the number on the scale will be exactly 2.0 mm below the figure immediately above it. See FIG. 10. Those skilled in the art will recognize that the spiral scale can easily be created with a measuring surface of a different diameter and/or different screw threading of the adjustment shaft without departing from the scope of the invention.

In a preferred embodiment, the spiral scale 103 will include both metric and imperial units. After having determined the position of the figures in the first scale, for example, metric, the figures for the imperial scale can be inserted directly into the middle of each of the 10 equal indexes. To improve the readability of the figures, the different scales can be slightly offset from one another. Also, the font or highlighting of the different scales can be different to avoid confusion when reading the various scales.

The scale ring 102 further comprises a connecting portion 106 that is configured to connect the scale ring to the adjusting nut 95. The connecting portion includes a series of fins 107 and one primary groove 109. The fins 107 are spaced away from an end 105 of the scale ring. Said end 105 includes a lip 108. The primary groove 109, however runs all the way to the end of the scale ring. The primary groove 109, is configured to be engaged by a screw 89 that is positioned inside the handle 88. Thus, when the handle 88 is rotated, the screw 89 engages one of the fins 107 that are adjacent the primary groove 109, and subsequently rotates the scale ring. The lip 108 of the connecting portion 106 is configured to be received by a scale holder 110. The scale holder 110 is configured to simultaneously engage both the lip 108 and the adjusting nut 95. The scale holder engages the lip 108 in such a manner that rotational movement of the scale ring is free while axial movement of the scale ring is limited. The scale holder may be attached to the adjusting nut 95 via screw 112. Because the scale holder 112 attaches the scale ring to the adjusting nut 95, any translational movement of the adjusting nut also translates the scale ring. Those skilled in the art will recognize that the scale ring 102 and/or scale holder 110 of the present invention can be used in conjunction with any torque wrench.

In a preferred embodiment, measurement surface 104, and more particularly, the spiraling scale is visible from outside of the torque wrench. This is achieved via a nose 114 that includes one or more lenses 116. In one embodiment, nose 116 includes two lenses that permit visual access to both the spiral scale having metric units and the spiral scale having imperial units. Those skilled in the art will recognize that the nose 114 may also include a nose cap 115 and hose holder 117, which assist in maintaining the position of the nose 114 on the torque wrench.

The operation of the torque wrench 10 will now be described in greater detail. First, the operator grasps the wrench 10 about the handle 88 of the adjuster 60 and removably engages the head 22 with the fastener. The user then applies force to the wrench body 30, which is transmitted as torque to the removably engaged fastener via the tang engaging and stabilizing structure 40 and the fastener drive structure 20. However, this force also tends to pivot the casing structure 32 relative to the fastener drive structure 20 about the pivot axis 80.

In the type of wrench where a ratchet drive assembly is used, when the socket of the head 22 is coupled to a fastener in torque transmitting relation, the manual force applied in the torque applying direction to the wrench body 30 is transmitted from the wrench body 30 to the fastener drive structure 20 and then from the fastener drive structure to the fastener via the driving engagement between the pawl and the ratchet gear so as to apply torque to the fastener to affect rotation thereof. A manual force applied to the wrench body 30 in a ratcheting direction, opposite the torque applying direction, causes rotation of the wrench body 30 relative to the ratchet gear with the pawl repeatedly ratcheting over the gear teeth against the biasing of the pawl biasing element.

The biasing force applied by the biasing element 50 maintains the tang engaging and stabilizing structure 40 in engagement with the tang rear end portion 27, particularly the tilt block 90, so as to maintain the casing structure 32 and the fastener drive structure 20 in the normal position thereof until a torsional resistance offered by the fastener reaches a threshold level determined by the biasing force of the biasing element 50. Specifically, in the illustrated embodiment, the engagement of the tang engaging and stabilizing structure 40 maintains the tang structure 24 (and the entire fastener drive structure 20) in substantial alignment with the casing structure 32. In this position, the forward end 92 and the rearward end 94 of tilt block 90 are flushly engaged to the rear end portion 27 and pusher respectively. At the threshold level of fastener resistance, the force being applied to the wrench body 30 overcomes the biasing force of the biasing element 50 and pivots the casing structure 32 relative to the fastener drive structure 20 to the torque exceeded position, in this position, the tilt block 90 tilts such that edges 96 and 98 are respectively engaged to the rear end portion 27 and pusher 100. As the tilt block 90 tilts, this generates the torque exceeded signal. The signal indicates that the torsional resistance being offered by the fastener has reached the threshold level.

The torque exceeded signal is generated by the rear end portion 27 of the tang structure 24 and the casing structure 32 contacting one another in the torque exceeded position to generate an audible noise. It is contemplated that a contact switch may be positioned at the contact point of the tang structure 24 and the casing structure 32 which actuates a signal light or audible beeping noise to the user that the threshold level has been reached.

The tilt block 90 and the recesses 29, 49 are configured such that, during the pivotal movement of the casing structure 32 relative to the fastener drive structure 20 to the torque exceeded position, the tilt block 90 pivots with one edge of the forward end 92 thereof pivoting about one edge of the recess 29 of the tang rear end portion 27 and an opposite one of the edges of the rearward end 94 thereof pivoting about the recess 49 of the pusher 100. The biasing element 50 is increasingly stressed during the aforesaid pivotal movement thereof by the tilt block 90 urging the tang engaging and stabilizing structure 40 rear-wardly as a result of the distance between the opposite edges thereof being greater than the adjacent edges thereof.

The biasing force applied by the biasing element 50 maintains the engagement of the recess 49 of the pusher 100 with the tilt block 90 so as to maintain the casing structure 32 and the fastener drive structure 20 in the normal position thereof, as shown in FIG. 3-4, until the torsional resistance offered by the fastener reaches the aforesaid threshold level whereat the force being applied to the casing structure 32 is sufficient to affect the aforesaid pivotal movement of the tilt block 90 against the biasing force of the biasing element 50.

The adjuster 60 sets the aforesaid threshold level of torsional resistance at which the force being applied to the wrench body 30 pivots the casing structure 32 relative to the fastener drive structure 20. As aforesaid, handle 88 of the adjuster 60 may be rotated relative to the casing structure 32 to adjust the adjustment shaft 62 and hence the biasing force applied to the tang engaging and stabilizing structure 40 by the biasing element 50.

The torque wrench 10 of the present invention must be calibrated prior to its initial use and periodically throughout its useful lifetime. Generally speaking, calibrating a torque wrench is an iterative two-step process wherein, in the first step, the preload of the biasing element is set, and in the second step the internal leverage associated with the tilt block 90 is set. The present invention provides a marked improvement in the method associated with the first step.

The disclosed method of calibrating a preload of a biasing element comprises a first step of providing a torque wrench according to the present invention. Said torque wrench including a biasing element having useful preload range from a first value to a second value. For example, the torque wrench may have a useful range from 5-25 Nm, 10-50 Nm, 20-100 Nm, 40-200 Nm, 60-340 Nm or any other range. For the purposes of our example, let's presume that we will be calibrating a torque wrench having a useful range of 10-50 Nm. Thus, the first value is 10 Nm, and the second value is 50 Nm.

Next, the torque wrench is placed on a calibration bench in a levelled position. A calibration bench that accurately measures the torque applied by a torque wrench. The square socket of the torque wrench is inserted into the calibration bench and the handle is oriented in a level position.

After placing the torque wrench on the calibration bench, a torque is applied to the handle until the torque exceeded position is reached. The calibration bench measures this initial torque value and gives a reading of the same. In our example, let's presume that this initial torque value is measured as 5 Nm. This initial torque value is compared to the first value of 10 Nm. 5 Nm vs. 10 Nm is well outside of an acceptable tolerance of, for example ±2%.

Because the initial torque value is outside of an acceptable tolerance, preload of the biasing element must be adjusted. This adjustment can be achieved rotating the adjuster 60 to compress the biasing element 50. More specifically, the locking ring 91 is disengaged by pulling it down against spring 93 at which point the handle 88 can be rotated. When the handle 88 is rotated, the handle insert 74 that is disposed within the handle recess 92 is also rotated. The splines of the handle insert, and mated splines of the adjustment shaft are also rotated. Thus, the entire adjustment shaft is rotated. As the threaded portion of the adjustment shaft is rotated, mated threads of the adjusting nut cause the entire adjusting nut to translate axially. As show in FIGS. 3 and 4, this causes the spacer 70 and washer 72 to compress the biasing element 50. After using the adjuster 60 to compress the biasing element, another torque is applied to the torque wrench and a new initial torque value is measured. This new initial value is compared to the first value of 10 Nm. This process of adjusting the adjuster to apply (or relieve) biasing force in the biasing element; applying a torque to the torque wrench; measuring an initial torque value and comparing it to the first value is repeated until the initial torque value is within an acceptable tolerance of the first torque value.

Figure 5B:
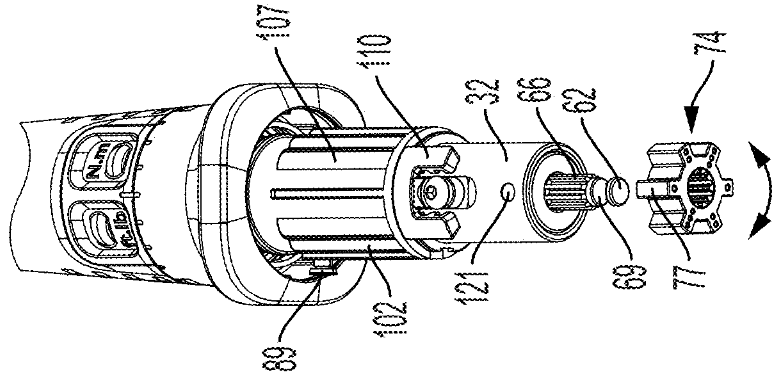
FIGS. 5*a* and 5*b* are alternate perspective views of partially exploded adjuster of the torque wrench of the present invention; member constructed in accordance with the principles of the present invention.
Figure 5A:
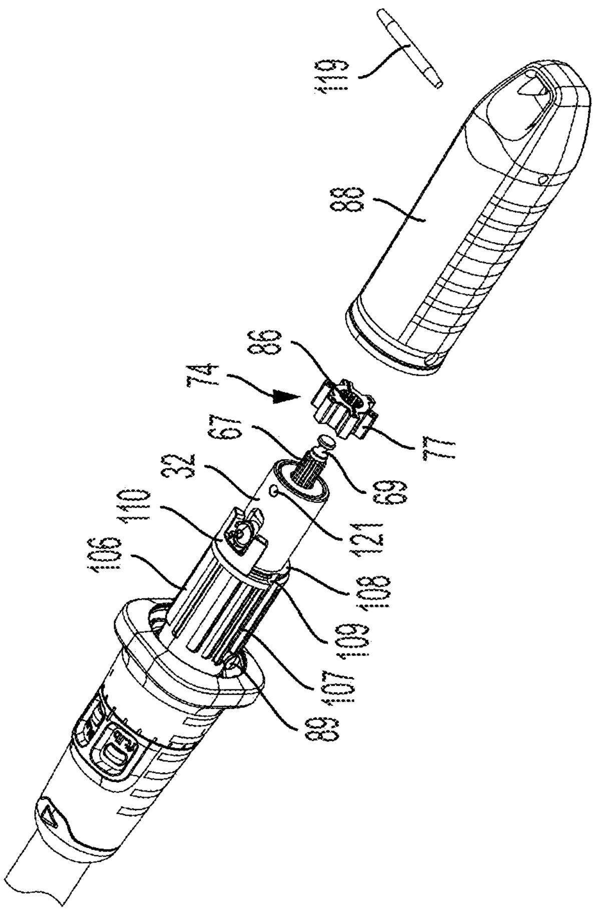
Figure 6:
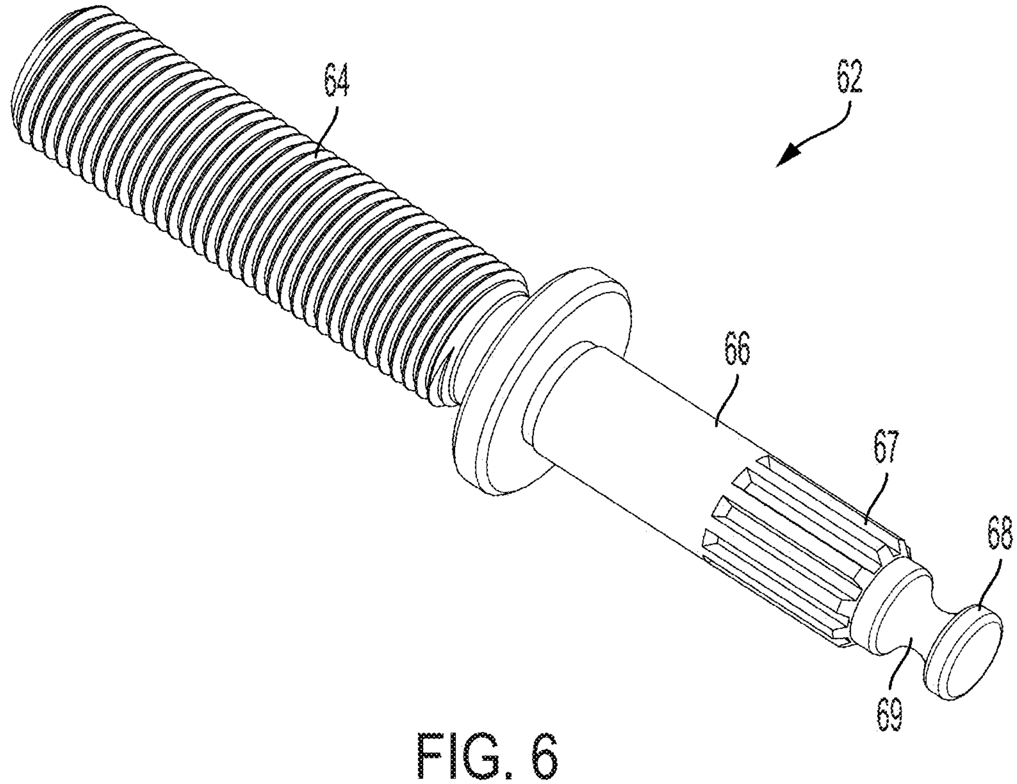
FIG. 6 is a perspective view of an adjustment shaft of an adjuster of the torque wrench.

Those skilled in the art will recognize that the adjusting the biasing element has caused the adjuster itself and the scale ring (if present) to be misaligned. Thus, the next step is to partially disassemble the adjuster and realign the handle 88, handle insert 74 and primary axis pin 82. Additionally, if present, the scale ring can also be adjusted to be set such that 10 Nm is visible through the lens 116 of the nose 114. As seen in FIG. 5*a*, partially disassembling the adjuster 60 is done by first removing an axle pin 119, and then removing handle 88. Axle pin 119, is disposed in the handle 88 and engages the pin retaining portion 68 of the adjustment shaft 62. More specifically, axle pin 119 engages the chamfered groove 69 of the adjustment shaft. After removing the axle pin, the handle 88 can be removed. Following removal of the handle 88, the handle insert 74 is removed and rotated either clockwise or counter-clockwise until at least one of its external gears 77 is in the 12 o'clock position. This realignment may be guided by a hole 121 that is in an end portion 37 of the casing structure 32. Hole 121 is aligned with hole 38 and pivot pin 82, which are on the opposite end 35 of the casing structure. By aligning at least one of the gears 77 with the 12 o'clock position, an operator guarantees that future adjustments will accurately compress or decompress the biasing element in a manner that is accurate and consistent.

Now is a good time to talk about the specific features of the handle insert 74. Those skilled in the art will recognize that the handle insert 74 may be configured in an almost infinite number of ways with respect to the number of external gears and internal splines. However, due to engineering/manufacturing tolerances, it is preferable that the handle insert includes three (3) mirrored external gears and ten (10) internal splines. This leads to thirty (30) possible divisions as the handle insert is rotated about the adjustment shaft (i.e., 10 different spline positions for each of the three mirrored gears). It has been determined that individual incremental adjustments for these thirty divisions will add (or relieve) between 0.07 Nm (1.33%) for a small torque wrench sized 5-25 NM; or 1.33 Nm (2.22%) for a large torque wrench sized 60-340 Nm. These incremental adjustments are within the acceptable tolerance of ±2%. However, if the external gear to internal spline multiple was much less than 30 the individual increments could be out of tolerance especially at the larger wrench sizes. Conversely, the tolerances could be better with an external gear to internal spline multiple, such as of 60. (See table below). However, manufacturing and machining parts with this level of precision can prove to be costly and inefficient. Moreover, the improvement in tolerance may not be worth the extra cost/trouble.

| Model | Scale Increments (per turn) | Handle Insert Increment (60 Divisions) Nm | Handle Insert Increment (60 Divisions) % | Handle Insert Increments (30 Divisions) Nm | Handle Insert Increments (30 Divisions) % |
|---|---|---|---|---|---|
| 5-25 Nm | 2 Nm | 0.03 | 0.67% | 0.07 | 1.33% |
| 10-50 Nm | 5 Nm | 0.08 | 0.83% | 0.17 | 1.67% |
| 20-100 Nm | 10 Nm | 0.17 | 0.83% | 0.33 | 1.67% |
| 40-200 Nm | 20 Nm | 0.33 | 0.83% | 0.67 | 1.67% |
| 60-340 Nm | 40 Nm | 0.67 | 1.11% | 1.33 | 2.22% |

After aligning the handle insert such that one of its gears is in the 12 o'clock position, the adjuster needs to be reassembled. After having set the preload in the biasing element, the adjustment shaft cannot be moved at all. Otherwise, the preloading that we just worked so hard at calibrating will be lost and inaccurate. In the prior art, this was particularly difficult because adjustment shafts often included a cylindrical pin retaining portion that included two sets of perpendicularly aligned holes for receiving and retaining pin 121. One can imagine how difficult it would be to assemble the handle 88 and then try to locate one set of said perpendicularly aligned holes with the retaining pin 121 all without moving adjustment shaft and losing the calibrated preloading of the biasing element 50. The present invention overcomes this problem by completely doing away with the two sets of perpendicularly aligned holes for receiving and retaining pin 121. Instead, the present invention includes an adjustment shaft 62 having a pin retaining portion 68 with a circumferential chamfered groove 69. The chamfered groove 69 permits the retaining pin be easily engaged no matter how the adjustment shaft is oriented. Moreover, and critically, the insertion of the pin 121 in the handle 88 and engagement to the adjustment shaft, will not disturb the setting of the adjustment shaft and preload of the biasing element.

It can thus be appreciated that the objectives of the present invention have been fully and effectively accomplished. The foregoing specific embodiments have been provided to illustrate the structural and functional principles of the present invention and is not intended to be limiting. To the contrary, the present invention is intended to encompass all modifications, alterations, and substitutions within the spirit and scope of the appended claims.

The invention claimed is:

1. A torque wrench for applying torque to fasteners, said torque wrench comprising:

a fastener drive structure having a head constructed and arranged to be removably engaged with a fastener and a tang structure extending rearwardly from said head;

a wrench body including a casing structure, said fastener drive structure and said casing structure being pivotally connected for pivotal movement relative to one another about a pivot axis (A) from a normal position to a torque exceeded position to generate a torque exceeded signal;

a tang engaging and stabilizing structure having a tilt block and a pusher, and wherein said tilt block includes a forward end having a tang engaging surface and a rearward end having a pusher engaging surface, and wherein when said casing structure is in its normal position, the tang engaging surface flushly engages a rear end portion of the tang structure, and the pusher engaging surface flushly engages the pusher, and wherein when said casing structure is in its torque exceeded position, an edge of the tilt block that is adjacent the tang engaging surface engages the rear end portion of the tang structure, and another edge of the tilt block adjacent the pusher engaging surface engages the pusher;

a stressed biasing element applying a biasing force to said tang engaging and stabilizing structure such that, during a torque applying operation wherein a force applied to said wrench body (a) is transmitted as torque to a fastener removably engaged with said head and (b) tends to pivot said casing structure relative so said fastener drive structure about said pivot axis, the biasing force applied by said biasing element maintains the tang engaging and stabilizing structure in engagement with said tang structure rear end portion so as to maintain said casing structure and said fastener drive structure in said normal position thereof until a torsional resistance offered by the fastener reaches a threshold level determined by the biasing force of said biasing element whereat the force being applied to said wrench body pivots said casing structure relative to said fastener drive structure to said torque exceeded position to generate the torque exceeded signal, thus indicating that the torsional resistance being offered by the fastener has reached the threshold level;

an adjuster constructed and arranged such that rotational movement thereof adjusts the stress in said biasing element and hence the biasing force applied to said tang engaging and stabilizing structure by said biasing element so as to set the aforesaid threshold level of torsional resistance at which the force being applied to said wrench body pivots said casing structure relative to said fastener drive structure as aforesaid; and characterized in that said adjuster comprises an adjustment shaft having a threaded portion, a splined portion, and a pin retaining portion;

a handle insert having an outer surface shaped to define a plurality of gears arranged circumferentially about the handle insert, and an inner opening that is shaped to receive the splined portion of the adjustment shaft, and wherein the surface of said inner opening includes a plurality of splines arranged circumferentially about the inner opening and configured to mate with the splined portion of the adjustment shaft such that rotation of the handle insert will impart rotation to the adjustment shaft;

a handle having an open forward end and a closed rearward end, the handle having an interior recess configured to receive the handle insert, and wherein said recess is positioned within the handle such that a gear of the plurality of gears of the outer surface of the handle insert is in a 12 o'clock orientation within the handle and wherein when said handle insert is disposed in the recess, rotational movement of handle will impart rotational force to the handle insert and subsequently to the adjustment shaft;

an adjusting nut defining an opening having a threaded surface that is configured to mate with the threaded portion of the adjustment shaft, and wherein when rotational force is applied to the adjustment shaft, the mating threaded portions impart translational movement to the adjusting nut, which adjusts a thrust bearing and applies the biasing force of the biasing element; and wherein the handle insert comprises a removable insert that is removable from each of the adjustment shaft and the handle, such that the handle insert is angularly repositionable relative to the adjustment shaft and the handle.

2. The torque wrench of claim 1, wherein said pusher includes a seat configured to receive the tilt block.

3. The torque wrench of claim 1, wherein said adjuster further comprises a scale ring having a measurement surface visible from outside of said torque wrench and wherein said measurement surface includes a spiraling scale to provide a reading of a selected threshold level of torsional resistance at which the force being applied to said wrench body pivots said casing structure relative to said fastener drive structure, and wherein said scale ring further comprises a connecting portion that is connected to the adjusting nut such that translational movement of the adjusting nut also translates the scale ring.

4. The torque wrench of claim 3, wherein the scale ring is also selectively connected to the handle such that rotational movement of the handle also imparts rotational movement to the scale ring.

5. The torque wrench of claim 3, wherein said scale ring includes both imperial and metric measuring units.

6. The torque wrench of any of claim 3, wherein the spiraling scale has a thread pitch that is a multiple of a thread pitch of the threaded portion of the adjustment shaft.

7. The torque wrench of claim 3, wherein said adjuster further includes a scale ring holder that is configured to connect the connecting portion of the scale ring to the adjusting nut.

8. The torque wrench of claim 7, wherein the scale ring holder is secured to the adjusting nut with a screw that permits selective axial movement of the scale holder relative to the adjusting nut.

9. The torque wrench of claim 3, wherein the spiraling scale is a separate label that is affixed to the measurement surface.

10. The torque wrench of claim 3, wherein said scale ring includes both imperial and metric measuring units.

11. The torque wrench of claim 10, wherein said adjuster further comprises a nose positioned over a portion of said scale ring, so as to be positioned over said measurement surface, said nose comprising a pair of lenses that provide visual access to both of said imperial and metric measuring units.

12. The torque wrench of claim 3, wherein said pusher includes a seat configured to receive the tilt block.

13. The torque wrench of claim 3, wherein said connecting portion comprises:

a series of external fins arranged circumferentially about said scale ring; and a primary groove formed between an adjacent pair of external fins of said series of external fins;

wherein a screw provided in said handle engages said primary groove; and wherein when said handle is rotated, said screw engages one of said series of external fins to cause a corresponding rotation of said scale ring.

14. The torque wrench of claim 1, wherein said casing structure comprises:

a first hole formed therein at a front portion of said casing structure, said first hole aligned with said pivot axis (A); and a second hole formed therein at an end portion of said casing structure;

wherein said second hole is angularly aligned with said first hole; and wherein said second hole defines said 12 o'clock orientation and assists in positioning said gear at said 12 o'clock orientation.

15. The torque wrench of claim 1, wherein said plurality of gears is axially aligned with said inner opening, such that said plurality of gears surround said inner opening having said plurality of splines.

16. The torque wrench of claim 1, further comprising an axle pin disposed in said handle and that engages said pin retaining portion of said adjustment shaft, said axle pin removable from said handle to enable removal of said handle from about said adjustment shaft, said axle pin positioned rearward from said handle insert.

17. The torque wrench of claim 1, wherein said handle insert is housed entirely within said interior recess of said housing, with said plurality of gears engaging an inner surface of said casing structure.

18. The torque wrench of claim 1, wherein said plurality of gears and said plurality of splines provides thirty (30) or more divisions for incremental adjustment of said biasing force applied to said tang engaging and stabilizing structure, said divisions being a multiple of said plurality of gears and said plurality of splines.

19. The torque wrench of claim 1, wherein said handle insert comprises a singular, integrally formed insert.

20. A torque wrench for applying torque to fasteners, said torque wrench comprising:

a fastener drive structure having a head constructed and arranged to be removably engaged with a fastener and a tang structure extending rearwardly from said head;

a wrench body including a casing structure, said fastener drive structure and said casing structure being pivotally connected for pivotal movement relative to one another about a pivot axis (A) from a normal position to a torque exceeded position to generate a torque exceeded signal;

a tang engaging and stabilizing structure configured to control pivotal movement between the fastener drive structure and the casing structure;

a stressed biasing element applying a biasing force to said tang engaging and stabilizing structure to control transitioning from the normal position to the torque exceeded position during a torque applying operation where a force is applied to said wrench body, with said fastener drive structure and casing structure in said normal position until a torsional resistance offered by the fastener reaches a threshold level determined by the biasing force of said biasing element;

an adjuster constructed and arranged such that rotational movement thereof adjusts the stress in said biasing element and hence the biasing force applied to said tang engaging and stabilizing structure by said biasing element so as to set the threshold level of torsional resistance;

wherein said adjuster comprises:

an adjustment shaft having a threaded portion, a splined portion, and a pin retaining portion;

a handle insert having an outer surface comprising a plurality of gears arranged circumferentially about the handle insert, and an inner opening configured to receive the splined portion of the adjustment shaft, wherein a surface of said inner opening includes a plurality of splines arranged circumferentially about the inner opening and configured to mate with the splined portion such that rotation of the handle insert will impart rotation to the adjustment shaft;

a handle having an open forward end and a closed rearward end, the handle having an interior recess within which an entirety of the handle insert is positioned, such that said plurality of gears engage an inner surface of said casing structure, wherein when said handle insert is disposed in the recess, rotational movement of the handle imparts rotational force to the handle insert and subsequently to the adjustment shaft; and an adjusting nut defining an opening having a threaded surface that is configured to mate with the threaded portion of the adjustment shaft, and wherein when rotational force is applied to the adjustment shaft, the mating threaded portions impart translational movement to the adjusting nut, to control and adjust the biasing force of the biasing element.

* * * * *